United States Patent [19]

Cassady

[11] Patent Number: 5,145,530
[45] Date of Patent: Sep. 8, 1992

[54] METHOD OF SURFACE HARDENING TITANIUM AND OTHER METALS

[76] Inventor: William E. Cassady, P.O. Box 723, San Anselmo, Calif. 94960

[21] Appl. No.: 353,905

[22] Filed: May 18, 1989

[51] Int. Cl.$^5$ ................................................ C21D 9/00
[52] U.S. Cl. .................................. 148/565; 148/902; 148/668; 148/669; 148/672; 148/673
[58] Field of Search ...................... 148/4, 13, 14, 15.5, 148/902; 219/137.2

[56] References Cited

U.S. PATENT DOCUMENTS 2,674,542  12/1954  Alexander ............................ 117/22
3,737,290  12/1973  Frehn .................................. 29/182.7
4,212,900   7/1980  Serlin .................................. 148/15.5

OTHER PUBLICATIONS

Rocklin Mfg. Co., Sales literature, p. 3, Dec. 1988.
Linnert, *Welding Metallurgy*, A. W. S. Dec. 1965, pp.382-385, Carbon Arc Welding.
Coes, *Abrasives* pp. 115-119, Dec. 1988.
Jefferson, *Welding Encyclopedia* Dec. 1974, pp.A66-67.
Barksdale, *Titanium*, 2nd Edition, Dec. 1966, pp. 107-109, 115-118, 598-601.
Sacks, Welding:Principles & Practice, p. 235, p. 263, Dec. 1988.
Metals Handbook, A. S. M. 9th ed. vol. 6, pp.799-803, "Laser Melt/Particle Injection", & references, Dec. 1987.
International Aerospace Abstracts 3928 Category 26, A88-53978, Dec. 1988, Comp & Structure, Alum. Alloys produced by microarc oxidation, (Rus.).

*Primary Examiner*—Scott Kastler

[57] ABSTRACT

A method of hardening the surface of titanium and its alloys, and other structural metals which form hard carbides, by treating the surface thereof with a moving, discontinuous carbon arc.

The metal surface to be hardened, and a carbon electrode are made opposite poles of an electric current source, and moved and/or rotated with respect to each other so that a multiplicity of discontinuous electric arcs are produced between the carbon electrode and the metal surface.

Carbon particles transfer through the arc and alloy within craters of the instantly liquified and chilled substrate, producing a surface layer which, in the case of titanium, is hard and tough and adherent enough to form the working surface of abrasive cutting tools.

The process improves the appearance and durability of consumer items and reduces friction and wear on machine parts.

10 Claims, 2 Drawing Sheets

METHOD OF SURFACE HARDENING TITANIUM AND OTHER METALS

BACKGROUND

1. Field of Invention

This invention relates to a method of hardening the surface of metals or alloys comprised of, or containing, elements which form hard carbides, especially titanium and its alloys.

2. Prior Art

Much research and effort was expended to devise methods of winning titanium metal from its ores, and purifying it from environmental contaminants, especially oxygen, nitrogen and carbon, the presence of which had previously rendered the metal non-ductile.

When the ductile metal became available, alloy development was stimulated. Unlike carbon steel alloys, titanium-carbon alloys have no soft phase in which they can be machined and formed with relative ease. If enough carbon is added to provide hardness equivalent to steel, the alloy becomes unmachineable and loses both cold and hot ductility regardless of phase disposition.

When titanium-aluminum alloys were developed, strengths greater than the titanium-carbon alloys were achieved while still preserving workability. Of the presently available titanium grades and alloys, none has a carbon content over 0.1%, nor a hardness over RC 42.

In absence of a method of hardening the surface of such alloys, they are of limited applicability for certain uses, despite their very favorable yield strength to weight ratio, corrosion resistance and many other virtues. Machine parts in rubbing or sliding contact, or which are exposed to abrasive environmental conditions, should have a surface hardness equivalent to RC 55 or higher, to prevent galling, seizing and wear.

Of the titanium compounds, both the carbide and the nitride are among the hardest materials known. Diverse methods of manufacture are known, but the carbide can be formed by reacting the oxide or the metal with carbon at high temperatures, in a vacuum or under argon. The nitride can be formed at much lower temperatures by very slow absorption of nitrogen from the pure gas or from ammonia, in a pressurized vessel.

Although initially it was hoped that titanium carbide would become a new industrial abrasive because of its excellent hardness and observed oxidation resistance, it was soon discovered that the material became rapidly blunted in use. Oxidation and other reactions with the workpiece were suspected to cause wear of the abrasive grains.

So far as I am aware, no proposal has been made to overcome this problem, to reduce or renew the cutting surface, such as described in the present disclosure.

Attempting to combine the virtues of each material, Alexander, U.S. Pat. No. 2,674,542 (1951), proposed a method of vacuum brazing carbide particles to the surface of titanium, allowing the carrier alloy to diffuse into the surface of the metal. Subsequent research revealed the presence and liability of amorphous intermetallic compounds which would be formed by the carrier.

Nitriding of titanium articles was developed by 1953. But due to extreme surface stresses induced by the nitride film, extensive precautions must be taken to avoid dimensional changes during the nitriding, and during and subsequent to finish machining. Parts containing thin sections or acute edges cannot be easily nitrided because extreme brittleness results at these locations.

A sintered titanium-titanium carbide alloy was disclosed by Frehn, U.S. Pat. No. 3,737,290 (1973). But the size, shape, and production quantity limitations intrinsic to powder metallurgy are compounded, in this invention, by the short life of tooling exposed to severe contact with the hard particles.

More recent techniques for surface hardening titanium include ion implantation and ion plating, each producing extremely thin films, and laser melt/particle injection. In the latter process, a moving laser beam liquifies the surface while a stream of hard particles is fed into the molten pool. These processes are a conducted in vacuum.

The laser melt/particle injection process, especially, implies that it has not heretofore been sufficiently appreciated how rapidly carbon combines with molten titanium, the extent of titanium's preference for carbon over oxygen at high temperatures, or the extreme instantaneous temperatures produceable by electric arcs. In short, that carbide particles are produceable in situ on the surface of titanium by combination with carbon, in the natural atmosphere, rather than by the degrading of expensive particles by expensive equipment, in vacuum.

In the field of ferrous metals, two discoveries are of interest. In carbon arc welding and cutting, it had long been observed that the carbon arc offered a certain degree of protection against oxidation of the workpiece, but that the workpiece became excessively carburized, especially if the supply current was the wrong polarity. Opinion varied as to which was the correct polarity to minimize this phenomenon, but the result was not in doubt: the metal so effected became unmachineable.

In hardfacing, it was discovered that a micro-spark welding process could be used to weld a carbide facing to a steel tool surface. A hand held vibrator supported the carbide electrode while a variable transformer supplied a small welding current.

In summary, then, of the situation regarding titanium: No alloy is available which has adequate surface hardness for many applications. Presently known methods of hardening the surface of titanium and its alloys are elaborate, lengthy, unwieldy, require expensive furnaces or other heat sources, and a vacuum or controlled atmosphere environment, are unsuited for many applications or have other undesireable limitations.

Most users of titanium and titanium alloys, therefore, would welcome a method of hardening the metal surface that is convenient, economical, efficient and effective, does not require furnaces, lasers, vacuum pumps, or other expensive and bulky equipment, and whereby a finished surface can be produced upon a single article in a relatively short time.

Most users of ferrous alloys, or other alloys containing carbide forming constituents would welcome a method of surface hardening more adhesive than plating, more compatible and less distorting than welding, more accurately localized than case hardening, nitriding, induction hardening, and more economical by far in many instances.

OBJECTS AND ADVANTAGES

Accordingly, I claim the following as the objects and advantages of my invention. A process: to improve the hardness of the surface of titanium and its alloys.

And furthermore to provide for machine parts a surface layer of hardened metal that is resistant to galling and seizing in moving contact with other metal parts; and a surface which is also increased in abrasion resistance for increased wearing durability; which is improved in heat resistance and corrosion resistance; and to provide a surface layer that can be polished to a smooth final finish of greatly lowered coefficient of friction compared to the substrate.

Furthermore to provide for consumer items a hardened surface of attractive appearance that will offer increased resistance to scratching, and that will be substantially scratch proof in ordinary environments, so that items finished by said process will maintain their new appearance almost indefinitely.

To furthermore provide for consumer items a handle surface that is substantially non-slip, due to the slight roughening of the surface produced by said process, and which provides an improved gripping surface to the hand compared to a polished or unprocessed finish, and which can be used for tool handles, instrument handles, and the like.

To furthermore provide for consumer items a surface of reduced light reflectivity or glare, due to the same said roughening and which will be attractive for that reason on hand weapon surfaces, watch cases, and the like.

Further objects and advantages are to provide on titanium and its alloys, an abrasive surface that is hard enough to easily cut titanium, and other hard or tough alloys, and which is thick, tough and adherent enough to its substrate to withstand heavy moving contact with such alloys.

To furthermore provide for the manufacture of cutting or abrasive tools with titanium or titanium alloy substrate and having a working surface formed by the said process.

And to further provide that in suitable instances, the above mentioned working surface, or surfaces, may be continuously or periodically re-formed or renewed while the tool is in service.

To further provide the above mentioned objects and advantages to the processing of other metals besides titanium and its alloys, to the extent applicable, depending on their composition and treatment.

And to further provide the foregoing objects and advantages in a simple and convenient process of simple means and low investment cost.

Readers will find further objects and advantages of the invention from a consideration of the ensuing description of the process, examples and drawings.

LIST OF REFERENCE NUMERALS AND LETTERS

Figure 7:
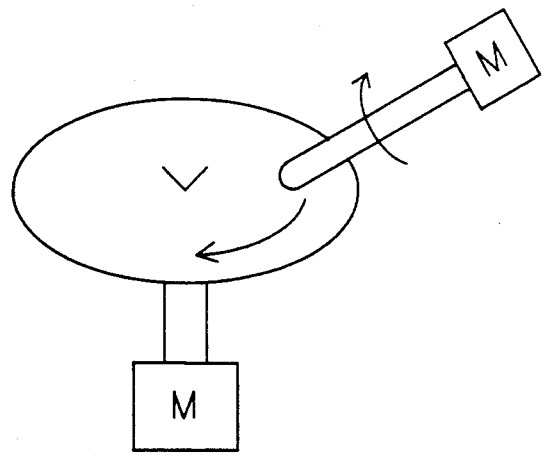
FIG. 7 is a diagram of a workpiece disc, held and rotated by a motor, M. A single electrode, such as illustrated in FIG. 3, is held and rotated against the workpiece by another motor, M.

20 Carbon of electrode
22 Foil wrapping on carbon 20, of electrode
24 Twisted wire to hold composite electrode assembly.
26 Conductive metal electrode axle.
28 Radial slot in carbon of electrode
30 Circumferential slot in carbon of electrode
32 Axial hole in carbon, for electrode axle.
40 Blade processor for band saw.
42 Drive wheel for band saw.
44 Workpiece support for band saw.
46 Blade for band saw.
48 Idler wheel for band saw.
50 Workpiece support for disc saw.
52 Saw disc.
54 Disc blade processor.
M Motor, to hold and rotate electrode or workpiece.
V Vibrator, motor to vibrate, occillate or reciprocate electrode rapidly to and from the work surface.

DESCRIPTION OF PROCESS

A carbon electrode is prepared. By carbon, I understand an electrode comprised substantially of carbon in any of its allotropic forms. The carbon-graphite, or carbon-graphite-rare earth mixtures supplied for welding and cutting purposes are suitable, if the size is appropriate for the work to be performed. These electrodes are available in diameters ranging from ¼ inch to ⅜ inch, and commonly have an outer wrap of copper foil, which is convenient, though not necessary for our purpose.

Figure 3:
FIG. 3 shows a carbon electrode comprised of a carbon cylinder, 20, partially wrapped in a foil covering, 22, and showing radial slots, 28 cut into the carbon at the working end.
Figure 2:
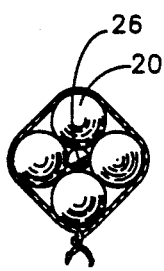
FIG. 2 shows an end view of FIG. 1.
Figure 1:
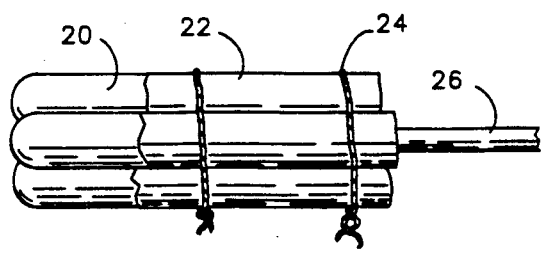
FIG. 1 shows a side view of a composite electrode comprised of four cylindrical carbons, 20, partially unwrapped from their copper foil coverings, 22, and bound together around a central conductive metal electrode axle, 26, by twisted wires, 24, in preparation for permanent attachment by welding or brazing.

The electrode is cut to length, commonly about 3 or 4 inches, and the foil wrapping peeled back from the tip for a distance of an inch or so, and trimmed, exposing a working length of carbon, as illustrated in FIGS. 1 and 3. If used singly, the electrode is then clamped or crimped to a conductive rod by which it is secured to a motor, to be described. If desired, multiple electrodes are prepared and assembled into a bundle parallel to and surrounding a central conductive rod, usually copper or brass, which will form the electrode axle, 26, FIGS. 1, 2., then bound with thin wires, cinched with a twist, and the whole welded or brazed together. One such multiple electrode is illustrated in FIGS. 1 and 2.

Figure 4:
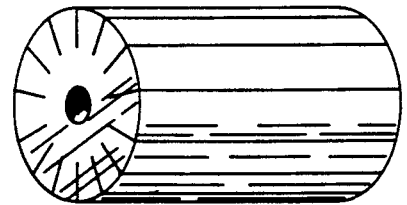
FIG. 4 shows a carbon electrode of cylindrical shape, with radial slots, 28, and circumferential slots, 30, machined from a solid carbon rod, or, alternatively assembled from discs by means of an electrode axle running through optional hole 32.

Electrodes of greater diameter may be procurable in rod form, and may be then slotted radially and circumferencially as shown FIG. 4, 28,30. Or the electrode may be cut from carbon blocks or sheets and assembled in multiple to the length desired. One such configuration would be identical to the electrode described by FIG. 4, with the addition of the axial hole, 32, FIG. 4, to secure the electrode segments to the electrode axle. The figures shown herein are intended to be illustrative and suggestive, and not exhaustive or restrictive. Electrode shape possibilities are endless, and a particular shape may be configured to fit a particular application.

No limitations on electrode greatness are forseen, other than the obvious limitations imposed by the power supply capacity and corresponding cooling requirements. On the miniature side, electrodes down to 0.5 mm. have been used at about 5-6 volts, to harden the inside of a small bore, and it is envisioned that smaller electrodes than this may be used if they can be procured and supported.

Rotary electrodes benefit from being serrated or slotted radially, as shown in FIGS. 3, 4, and if it is to be used parallel to the work surface, slotted circumferencially as well, as shown in FIG. 4, 30, as this will ordinarily facilitate the type of arc discharge desired, as will be explained.

Figure 8:
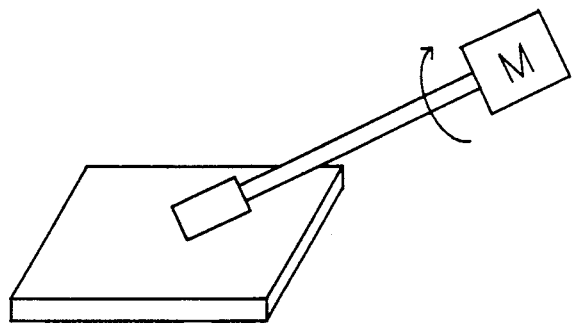
FIG. 8 shows a flat workpiece, which may be held stationary or moved in any suitable manner within its own plane. A rotating electrode makes contact with the surface, held and driven by a motor, M.
Figure 6:
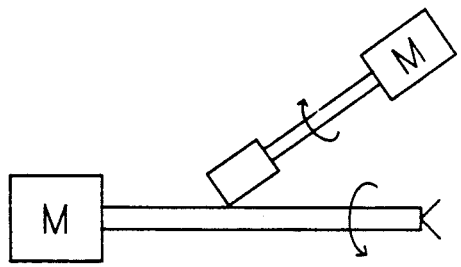
FIG. 6 is a diagram of a horizontal cylindrical workpiece, held and rotated by motor M. A composite electrode, such as illustrated in FIGS. 1 and 2, is held and rotated against the workpiece by another motor, M.
Figure 5:
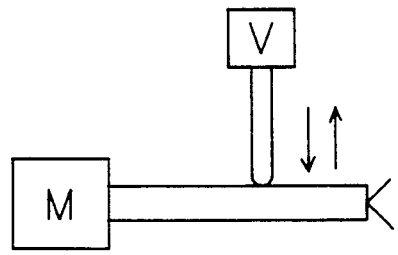
FIG. 5 is a diagram of a horizontal cylindrical workpiece, supported and rotated by motor M. Vibrator, V, supports the electrode and drives it rapidly to and from contact with the work surface.

The electrode, or electrode axle 26 is then affixed to a motor, M, capable of rotating it at a convenient speed or speeds, as diagrammed in FIGS. 6, 7 and 8, or, alternatively, secured in place of an engraving bit or chisel or similar tool in a machine or motor which will cause it to occillate rapidly to and from the work surface, such as the vibrator named in the diagram of FIG. 5.

The workpiece is ordinarily titanium, or titanium alloy, but possibly any structural metal which includes carbide forming elements.

Electric leads are connected to the electrode and to the workpiece so that there is a difference of potential between them. In absence of universally accepted nomenclature, when direct current is used, that polarity which conveys the more carbon from the electrode to the metal surface is preferred. This is usually visible, and can be determined and verified by a brief working test as described in Example 1, to follow. A variable voltage supply adjustable in the range of about 3-30 volts can be used. If a fixed voltage supply is used, 12 volts will give good results for many requirements, as will be described in the Examples below.

The workpiece, if of a generally cylindrical or disc shape, is spun at a convenient speed, commonly from 200-1200 r.p.m, as diagrammed in FIGS. 5, 6, 7. If the workpiece is flat, it may be secured to a rotary table, or orbitally moving platform, or moved in another suitable fashion in its own plane, or else held stationary, as diagrammed in FIG. 8.

The energized electrode, now also rotating or occillating, is brought into light or intermittent contact with the workpiece, so that arc discharging is observed between them, and in such a manner that distinct and separate craters can be observed upon the surface of the workpiece. Depending upon conditions, it may appear to the eye that the arc is sustained or continuous, however it will become evident, upon examination of the crater pattern caused by an electrode tracked across a fresh surface, that each discharge of the arc is separated from another by an interval of time or space or both.

If the outside surface of a generally cylindrical workpiece is being processed, there may be observed traces of liquid metal slung out of craters by centrifugal force. In this case, electrical power to the electrode may be reduced, or the rotational speed of the workpiece reduced, or increased.

Rotational speed of the electrode may be adjusted to suit the rotational speed of the workpiece. Electrode and workpiece are usually rotated in the directions that will minimize surface velocity differentials, but this intuitive precaution may be unnecessary under some conditions. More will be said on this subject below.

For the vibrating or occillating electrode, it is sometimes inconvenient to adjust the stroke rate. For this, or the rotating electrode, power may be initially reduced to the electrode. Once an initial surface coverage has been produced on a lowered power setting, it will then be possible to return to a higher power setting, since the partially transformed surface will have now been elevated in melting point.

Centrifugal force has less effect on the processing of the flat side of a spinning disc, but it is still possible to lose or displace metal if excessive electrode power is used.

Stationary work can withstand more vigorous processing without loss or displacement of metal. However vibrating or reciprocating electrodes are slow in this configuration. Much higher conversion rates are possible with a rotating electrode, as diagrammed in FIG. 8. The spinning electrode is supported at an angle of from about 20° to 80° toward the vertical from the horizontal work surface, and tracked across it in a pattern suitable to cover the desired surface.

For large flat areas, large ganged cylindrical electrodes, such as exemplified in FIG. 4 may be moved brush like over the surface with the electrode axes parallel to the work surface.

For rotating surfaces, rotating electrodes are commonly supported at similar angles to those used for stationary surfaces, i.e. from about 20° to 80° from the work surface. The vibrating electrode is used much closer to perpendicular as diagrammed, FIG. 5.

It was at first believed that if the work were moved at a high surface speed, then the electrode would have to be rotated rapidly also, in a direction to compensate, and, in effect, slow the rate of relative motion between them. However, as Example 4 demonstrates, under some conditions where the work surface is traveling rapidly, electrode rotation may be stopped, and power increased, while still maintaining a proper arc discharge. At lower rotational speeds this would result in a surface gouge which would spoil the work, so this proceedure should be tried only after gaining familiarity with the process.

As processing proceeds, an initial coverage of hardened craters is observed. Due to the inevitable random component of the process, and according to the size of the craters being formed, it is likely that there will be observed some voids, and some overlapping or superimposed craters. Longer processing will cover these voids and cause further superimpositions until, for a given power setting, little further change is apparent, and processing may be said to be complete. Craters, for the most part are indistinguishable, and the surface now presents an even texture. Neither benefit nor detriment has been observed from longer processing, although loose carbon will continue to be deposited on the surface of the workpiece.

The process is normally conducted in a natural atmospheric environment. A protective shield of inert gas, or nitrogen, or a partially evacuated atmosphere may be used, as will be understood by those skilled in the art. But these measures are not necessary to accomplish the results described herein.

POWER SUPPLIES

Current draw for a single ⅛ inch vibrating electrode is estimated to average 8–10 amperes. Due to the nature of the current flow created by the discontinuous arc, it is believed that instantaneous current demands are many times this average value. Transformer-rectifier power supplies are commonly designed and rated for steady demand conditions, and may not be able to supply instantaneous current flows much above their rated capacity.

The more efficient rotating electrodes place proportionately higher demands on the supply of current. Stationary electrodes, as described in Example 5, can draw a current estimated to average 80–150 amperes.

Storage batteries, designed for high discharge rates, have been found a most useful supplement for the rectified power supply, costing only a small fraction of what a rectifier capable of delivering equal instantaneous currents would.

Happily, 12 volts is a widely useful voltage for processing titanium, producing a suface roughness similar to 320–400 grit abrasive paper. Higher voltages tend to disrupt the surface more, producing a deeper and rougher surface surface region.

EXAMPLES

In the examples that follow, all titanium specimens were lightly surface ground to remove surface scale or contaminants, then cleaned with acetone immediately prior to processing. Electrode power was from a rectified power supply, supplemented by a 12 volt storage battery rated at 475 amperes short discharge rate, connected in parallel. Current to the electrode was limited by a short length of 0.062 inch brass wire used as electrode lead, except where noted in Example 4.

For the stationary electrode in example 4, the lead in wire was removed from the circuit , and the ⅛ inch electrode connected connected directly by a heavy clamp and wire capable of carrying the whole battery discharge current. Judging from the rate of conversion and electrode heat, the current in this mode would have been 100 amperes or more.

EXAMPLE 1

Two mild steel bolts, 5/16 and ⅛ inch diameter were selected from scrap stock and the unthreaded shanks ground to clean metal. Bands of surface processed material were produced by rotating at 1200 r.p.m. and briefly processing with an intermittent DC arc. Bands nearest the threaded portions were processed with the electrode connected to the marked negative side; bands nearest the head, with the connections reversed.

File tests on the processed bands revealed that on the ⅛ bolt, the electrode positive band had been hardened, but could be scratched, the electrode negative band could not be visibly scratched. On the 5/16 bolt, made of a softer steel, both bands were scratched, but the electrode negative band with more difficulty.

A ⅛ inch CP titanium rod was similarly processed at each electrode polarity. The electrode positive band was not perceptibly hardened. The electrode negative band could not be scratched by a tungsten carbide tool.

EXAMPLE 2

A ⅛ inch diameter CP titanium rod was rotated in a lathe attached to a DC positive lead. A ⅛ inch diameter, copper foil covered carbon electrode was placed into a brass ferrule and crimped onto a copper rod attached to a vibrator of the type used to drive engraving tools. The marked negative lead was connected to the copper rod. The electrically energized and vibrating electrode was tracked back and forth along the length of the titanium rod. The contacted rotating surface began to turn grey, and then dark grey or black. When examined with a 20× lens, numerous tiny craters were observed on the metal surface. After further processing, these craters were not separately distinguishable, and processing was stopped. After reaching a maximum of 1.5 thousandths of an inch diameter increase during processing, the final diameter was 0.001 inch increase.

The converted segment of the rod would then scratch glass, ceramic, hardened tool steel, files, tungsten carbide, and cobalt-tungsten carbide alloy. Chucked in a drilling machine, the rotated rod would abrasively carve all the above mentioned materials. The unprocessed CP titanium underlying this hardened layer has a hardness of about Brinell 200.

The rod was diametrically sectioned by an abrasive cut-off wheel Due to extreme feed pressure at the end of the cut, a sliver of the surface layer was torn from the side of the cut off end, and bent at a right angle, parallel to the blade. The sliver was otherwise undamaged and still clung intact to the workstock. The thus separated portion of the skin measured 0.012 to 0.014 inches, by micrometer, in thickness.

Similar samples were heated by torch for a few moments to orange heat, then quickly plunged into cool water. This treatment improved the appearance of the specimens, but no change in performance was observed.

EXAMPLE 3

A ⅛ inch thick flat plate of titanium alloy 6AL 4V was suported on a flat horizontal surface. A multiple carbon electrode was prepared, similar to the example illustrated in FIGS. 1 and 2. The electrode was spun by a motor so the electrode axle made an angle of between 20 to 80 degrees above the horizontal, and was moved over the work surface to accomplish processing.

The completed surface was ground to a smooth finish. Tests with various materials showed a useful reduction in sliding friction, about half that of an untreated surface of the alloy, of equal smoothness.

EXAMPLE 4

A 4½ inch diameter disc was prepared of 6 AL 4V titanium alloy, 1/16 inch in thickness. This was rotated at various speeds, between 200 and 1800 r.p.m. The occillating electrode of Example 2 was used up to speeds of about 500 r.p.m., but conversion rates were relatively slow for this size workpiece. The multiple electrode of Example 3. gave an improvement in processing speed. Then a ⅛ inch diameter, copper foil covered electrode was stripped about 1 inch down and the exposed carbon serrated or grooved radially with a knife edge saw. This electrode, when rotated, gave a considerable improvement in conversion rate, and allowed the disc to be processed up to 1800 r.p.m.

Finally it was tried to simply clamp the electrode in the power supply clamp and hold it against the rotating disc without itself being rotated. This configuration provided the highest conversion rate of all. The sides and edge of the disc were speedily completed at 1800 r.p.m. No notable differences in the quality of the surfaces produced by these electrode configurations were finally discernable.

The finished disc was used as an abrasive saw. It cuts 1/16 inch titanium with a speed exceeding that obtained with either steel blade or abrasive disc. At low cutting speeds, 200-400 s.f.p.m. it leaves a clean edged kerf. As speeds increase to the vicinity of 1800 s.f.p.m. the workpiece metal flows and cracks away from the kerf as a result of the impact, shock, heat and pressure of the firmly supported hard surface material. High carbon high chromium tool steel was also cut with this blade, as were samples of cobalt-tungsten carbide alloy, a material impervious to other metal blades.

As a result of the above examples of electrode polarity reversals, experiments with self electrodes, theoretical considerations, the listed hardnesses of titanium nitride and tungsten carbide, and further experiments of mine beyond the scope of this patent application, (Disclosure Document No. 222915), I have come to the reasoned belief that carbon is the element predominantly responsible for the above described hardening of the metal surfaces, and that the disclosed process forms primarily carbides of the matrix material, along with a lesser proportion of nitrides, and a yet lesser proportion of oxides.

Thus the reader will see that the process of hardening the surface of titanium and titanium alloys and other structural metals that comprise or contain carbide forming elements, of the present invention, provides considerable advantages of cost, quality, speed, simplicity and effectiveness compared with methods heretofore available.

While my above description contains many specifications, the reader should not construe these as limitations on the scope of the invention, but merely as exemplifications of preferred embodiments thereof. Those skilled in the art will envision many other possible variations or applications are within its scope.

For example, it is envisioned that many hard or tough alloys of the abrasive variety may be cut with blades surfaced by this process. But cutting difficult or unmachineable alloys is not the whole of the benefit.

Figure 9:
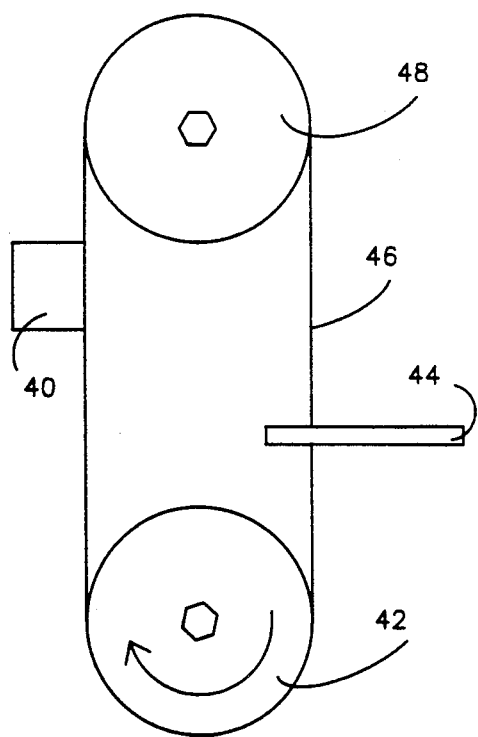
FIG. 9 is a digram of relevant bandsaw features, showing blade, 46, driven by drive wheel, 42, and around idler wheel 48. Workpieces are held on workpiece support 44 to be cut by the blade as it passes. As the blade further passes through blade processor, 40, at the back of the bandsaw, new cutting surfaces are formed on the blade by the herein disclosed process.
Figure 10:
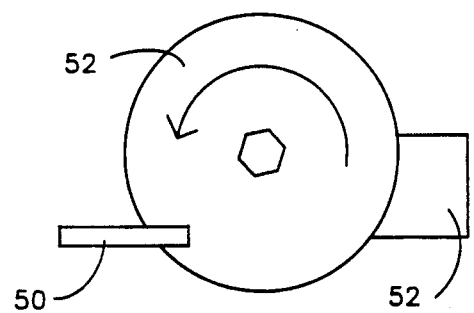
FIG. 10 is a diagram of a disc blade saw, showing the saw disc, 52, and the workpiece support, 50. On the back of the disc is mounted a disc blade processor, 54, wherein the cutting surfaces of the disc are renewed by the process disclosed herein.

It is further envisioned, as diagrammed in FIGS. 9 and 10, that the blade edge of a disc saw or band saw, or their extensions into the third dimension, a drum or belt sander, may be replenished by reprocessing during work intervals. Or, if space permits, continuously replenished while cutting, on the opposite side of the cutting site, by a suitably arranged electrode, or series thereof.

The conversion process is remarkably non-critical. As processing is prolonged, the texture becomes finer, coverage increases, and the amount of free carbon or unincorporated carbon-graphite on the surface increases. Therefore it is believed that a replenishment electrode may be left energized while such a machine is running without undue concern whether the machine is cutting at a particular time or not.

Further applications would include abrasive saws made of very thin titanium alloy for cutting thin materials or narrow slots; titanium grinding points shaped to produce a particular profile, then processed as described to produce their abrasive surface.

Titanium skins for aircraft or aerospace applications may be processed to improve their resistance to heat, oxidation, friction, and impact from environmental particulates. Curved panels may be shaped and assembled into final form. Processing electrodes can then harden the surface, the carbon deposit and slightly roughened surface providing positive assurance of coverage.

Many other alloys that would benefit from a hardened surface are processable in similar fashion, although not to the same degree of hardness as titanium.

It is envisioned that, in some situations it may be found advantageous to use an alternating current in place of the direct current as described herein.

It is further envisioned that a periodic high voltage, high frequency low amperage ionizing current could be superimposed upon the low voltage direct current, thus inducing a low voltage high current density arc. In contrast to the use to which such an ionizing current is presently used in welding; to start and maintain a steady arc, here the ionizing current would be switched on and off with the work current, or, being switched alone, would control the discharge of the arcs, serving as a kind of high speed electronic relay. This arrangement might allow the satisfactory processing of flat workpieces with flat electrodes parallel to the work surface and at a fixed gap distance.

However the direct current electrode is presently preferred.

Accordingly, the scope of the invention should be determined, not by the embodiments which have been illustrated here, but by the appended claims and their legal equivalents.

I claim:

1. A process for increasing the surface hardness of structural metals which are comprised of, or contain, elements which form hard carbides, comprising the steps of:
   connecting an electric current source to an electrode comprised substantially of carbon, and a piece of said metal so that there is a difference of electric potential between them, and,
   moving said carbon electrode or said metal relative to each other, and in such proximity or contact that a multiplicity of discontinuous electric arcs is discharged between said carbon electrode and said metal, and causing a corresponding multiplicity of discrete craters to be produced in the surface of said metal, and
   whereby the regions of said craters in said metal are increased in hardness thereby, and,
   whereby the progressive accumulation and superimposition of said regions of said craters thereby result in a useful increase in the hardness and durability of the surface of said metal.

2. The process of claim 1, wherein said metal is titanium, or an alloy of titanium.

3. The process of claim 1, wherein said metal is comprised of, or contains one or more of the elements: iron, boron, beryllium, chromium, hafnium, molybdenum, nickel, niobium, silicon, tantalum, tungsten, vanadium, zirconium.

4. The process of claim 1, wherein said electric current source is direct current, the polarity being arranged for a maximum transfer of carbon from said carbon electrode to said metal.

5. The process of claim 1, wherein said electric current source is periodically interrupted or reversed, or has a periodic voltage or current fluctuation, or is composite.

6. The process of claim 1, wherein said process is conducted in a natural atmosphere.

7. The process of claim 1, wherein said process is conducted wholly or in part under inert gas or in a partial vacuum.

8. The process of claim 1, wherein said carbon electrode is notched, cut, serrated or otherwise shaped; or multiple electrode elements assembled together to comprise said carbon electrode, to facilitate the formation of said discontinuous electric arcs, or increase the number of sites or rate of discharge of said arcs.

9. The process of claim 1, wherein said process is a process to harden the surface, or portions thereof, of cutting or grinding tools.

10. The process of claim 1, wherein said process is a process to continuously or periodically form or renew the working surfaces of powered cutting or abrasive tools.

* * * * *